(12) United States Patent
Brahim

(10) Patent No.: US 9,237,035 B2
(45) Date of Patent: *Jan. 12, 2016

(54) TECHNIQUE FOR IMPLEMENTING AN OPTICAL/TDM VIRTUAL PRIVATE NETWORK

(71) Applicant: RPX CLEARINGHOUSE LLC, San Francisco, CA (US)

(72) Inventor: Hamid Ould Brahim, Kanata (CA)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/302,207

(22) Filed: Jun. 11, 2014

(65) Prior Publication Data

US 2014/0369692 A1 Dec. 18, 2014

Related U.S. Application Data

(63) Continuation of application No. 10/326,121, filed on Dec. 23, 2002, now Pat. No. 8,799,430.

(60) Provisional application No. 60/387,649, filed on Jun. 11, 2002.

(51) Int. Cl.
*G06F 15/173* (2006.01)
*H04L 12/46* (2006.01)
(Continued)

(52) U.S. Cl.
CPC .............. *H04L 12/4641* (2013.01); *H04J 14/08* (2013.01); *H04Q 11/0062* (2013.01); *H04L 2012/5621* (2013.01); *H04Q 11/0071* (2013.01); *H04Q 2011/0033* (2013.01)

(58) Field of Classification Search
CPC .. H04L 12/4641; H04J 14/08; H04Q 11/0062
USPC ........................................................ 709/223
See application file for complete search history.

(56) References Cited

U.S. PATENT DOCUMENTS 6,097,807 A    8/2000   Leslie et al.
6,532,088 B1   3/2003   Dantu et al.
(Continued)

FOREIGN PATENT DOCUMENTS

EP    1100232    5/2001

OTHER PUBLICATIONS

Brahim, et al, "BGP/GMPLS Optical/TDM VPNs", Draft-Ouldbrahim-BGPGMPLS-OVPN-02, Nov. 2001, pp. 1-17, XP002252506, Retrieved from the Internet: url:http://www.watersprings.org/pub/id/draft-ouldbrahim-bgpgmpls-ovpn-02.txt, retrieved on Aug. 25, 2003.

(Continued)

*Primary Examiner* — Maceeh Anwari
(74) *Attorney, Agent, or Firm* — Pearne & Gordon LLP

(57) ABSTRACT

A technique for implementing an optical virtual private network is disclosed. In one particular exemplary embodiment, the technique may be realized by a method comprising the steps of managing at least one client edge-virtual private network at a client edge by a service provider; and supporting a set of client edge-users at each client edge-virtual private network at each client edge wherein each client edge provides at least one virtual private network service to each client edge-user; wherein each client edge determines connectivity associated with each client edge-user and the service provider establishes the connectivity determined by each client edge.

22 Claims, 4 Drawing Sheets

(51) Int. Cl.
*H04Q 11/00* (2006.01)
*H04J 14/08* (2006.01)
*H04L 12/70* (2013.01)

(56) References Cited

U.S. PATENT DOCUMENTS

| | | | |
|---|---|---|---|
| 6,717,944 | B1 | 4/2004 | Bryden et al. |
| 7,155,740 | B2 | 12/2006 | Brustoloni |
| 2002/0141408 | A1 | 10/2002 | Chang et al. |
| 2003/0115361 | A1 | 6/2003 | Kirk et al. |

OTHER PUBLICATIONS

Yong Xue, "Carrier Optical Services Requirements", Draft-IETF-IPO-Carrier-Requirements-02.TXT, Mar. 2002, XP002252508, retrieved from the Internet: url:http://www.potaroo.net/ietf/xld-ids/draft-ietf-ipo-carrier-requirements-02.txt, retrieved on Aug. 25, 2003.

Brahim: "Optical VPNs", MPLS 2001, October 7-9, 2001, pp. 1-12, XP002252507, retrieved from the internet, url:http://www.nortelnetworks.com/products/library/collateral/mpls2001_vpn_tutorial-part4.pdf, retrieved on Aug. 25, 2003.

Hamid, et al., GVPN: Generalized Provider-Provisioned Port-Based VPNs Using BGP and GMPLS, http://www.ietf.org/internet-draft-ouldbrahim-ppvpn-gvpn-bjpfmpls-02, pp. 1-198, Dec. 2002, "Work in Progress".

Hamid, et al., "VPOXC Provider Provisioned Virtual Private Optical Cross-Connect Service," http://www.ieft.org/internet-draft-ouldbrahim-ppvpn-vpoxc-01.txt, pp. 1-9, Jun. 2002, "Work in Progress".

TECHNIQUE FOR IMPLEMENTING AN OPTICAL/TDM VIRTUAL PRIVATE NETWORK

CROSS-REFERENCE TO RELATED APPLICATIONS

This patent application claims priority to U.S. Provisional Patent Application No. 60/387,649, filed Jun. 11, 2002, which is hereby incorporated by reference herein in its entirety.

FIELD OF THE INVENTION

The present invention relates generally to optical/Time Division Multiplexing (TDM) virtual private networks and, more particularly, to a technique for implementing a optical/TDM virtual private network.

BACKGROUND OF THE INVENTION

Due to recent developments in fiber-optics-based networks and carrier virtual private network technologies, optical virtual private network (OVPN) services are currently being explored in the industry. Most call-based network architectures currently deployed are designed towards providing a basic unit of service that usually entails providing connectivity between two network public entry endpoints. The set of services and associated network architecture are based on a call based model and require architectural building blocks that are call centric.

The call based model is characterized by an emphasis on bandwidth and connectivity, achieved generally through complex in-house built dedicated network solutions. As a result, the architecture is very expensive. Under the call based model, connectivity services are generally transport dependent type services. Oftentimes, these services require major and expensive upgrades to the transport technology used.

Currently, virtual private network (VPN) architectures built around the call based model focus on restricting connectivity to a group of users (e.g., closed-user group). Mechanisms used in these architectures are call centric, which involves a user subscribing to a closed-user group and a network defining a set of rules for incoming and outgoing calls to/from the group to an open portion of the network.

Call-based architectures have traditionally minimized or ignored the importance of providing carrier based VPN services that offer complete client flexibility, reduce operational complexity and introduce new added-value services beyond basic point-to-point connectivity.

In view of the foregoing, it would be desirable to provide a technique for implementing an optical virtual private network which overcomes the above-described inadequacies and shortcomings. More particularly, it would be desirable to provide a technique for implementing an optical virtual private network in an efficient and cost effective manner.

SUMMARY OF THE INVENTION

According to the present invention, a technique for implementing an optical virtual private network is provided. In one particular exemplary embodiment, the technique may be realized by a method for implementing an optical virtual private network, comprising the steps of managing at least one client edge-virtual private network at a client edge by a service provider; and supporting a set of client edge-users at each client edge-virtual private network at each client edge wherein each client edge provides at least one virtual private network service to each client edge-user; wherein each client edge determines connectivity associated with each client edge-user and the service provider establishes the connectivity determined by each client edge.

In accordance with other aspects of this particular exemplary embodiment of the present invention, the method further comprises the step of implementing a discovery mechanism for determining a client edge set having at least one client edge-user associated with a client edge-virtual private network; the step of enabling a first client edge-user to request a connection with a second client edge-user wherein the first client edge-user and the second client edge-user are associated with the same client edge-virtual private network; wherein the connection between the first client edge-user and the second client edge-user is established without intervention from the service provider; wherein membership information associated with one or more client edge-users is provided transparently to the service provider, wherein the membership information comprises one of a virtual private network identifier and a global unique identifier; wherein the client edge uses a private address to request connectivity to a destination client edge; wherein a connection with the client edge from a network associated with the service provider is established via a transport network assigned address; and wherein client edge comprises one or more of a router, cross connect device and a switch.

According to another particular exemplary embodiment, a computer signal embodied in a carrier wave readable by a computing system and encoding a computer program of instructions for executing a computer process performing the method recited above.

According to another particular exemplary embodiment, a system for implementing a carrier's carrier Optical Virtual Private Network comprises at least one client edge-virtual private network at a client edge wherein the at least one client edge-virtual private network is managed by a service provider; and a set of client edge-users supported by each client edge-virtual private network at each client edge wherein each client edge provides at least one virtual private network service to each client edge-user; wherein each client edge determines connectivity associated with each client edge-user and the service provider establishes the connectivity determined by each client edge.

In accordance with other aspects of this particular exemplary embodiment of the present invention, the system further comprises a discovery mechanism for determining a client edge set having at least one client edge-user associated with a client edge-virtual private network; a first client edge-user requesting a connection with a second client edge-user wherein the first client edge-user and the second client edge-user are associated with the same client edge-virtual private network; wherein the connection between the first client edge-user and the second client edge-user is established without intervention from the service provider; wherein membership information associated with one or more client edge-users is provided transparently to the service provider, wherein the membership information comprises one of a virtual private network identifier and a global unique identifier; wherein the client edge uses a private address to request connectivity to a destination client edge; wherein a connection with the client edge from a network associated with the service provider is established via a transport network assigned address; and wherein client edge comprises one or more of a router, cross connect device and a switch.

According to another particular exemplary embodiment, an article of manufacture for implementing a carrier's carrier Optical Virtual Private Network comprises at least one processor readable carrier; and instructions carried on the at least one carrier; wherein the instructions are configured to be readable from the at least one carrier by at least one processor and thereby cause the at least one processor to operate so as to: manage at least one client edge-virtual private network at a client edge by a service provider; and support a set of client edge-users at each client edge-virtual private network at each client edge wherein each client edge provides at least one virtual private network service to each client edge-user; wherein each client edge determines connectivity associated with each client edge-user and the service provider establishes the connectivity determined by each client edge.

In accordance with other aspects of this particular exemplary embodiment of the present invention, the article of manufacturing causes the at least one processor to operate so as to implement a discovery mechanism for determining a client edge set having at least one client edge-user associated with a client edge-virtual private network; and the article of manufacturing causes the at least one processor to operate so as to enable a first client edge-user to request a connection with a second client edge-user wherein the first client edge-user and the second client edge-user are associated with the same client edge-virtual private network.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
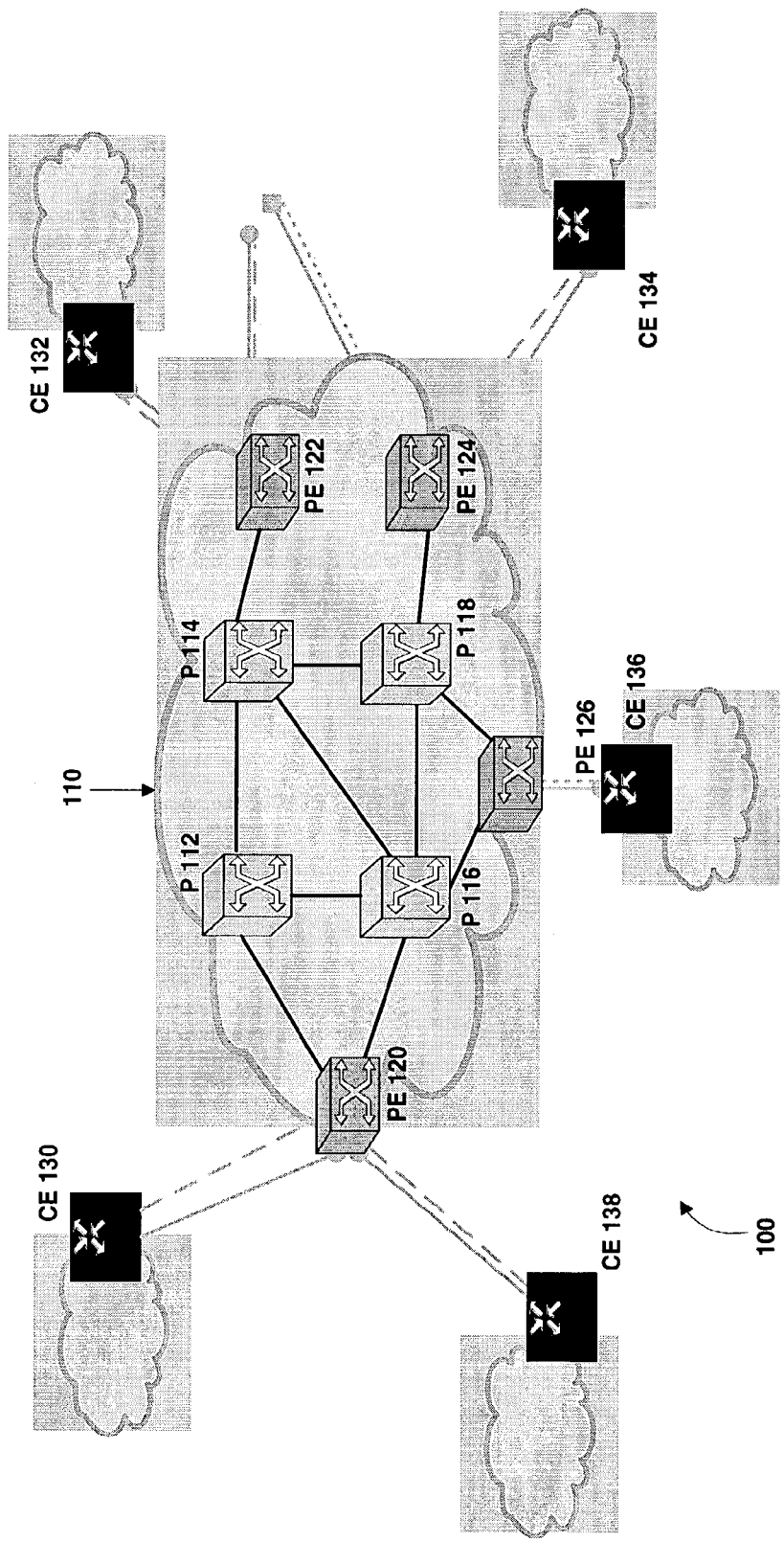
FIG. 1 is a diagram illustrating a reference model for layer-3, layer-2 and Optical VPNs in accordance with an embodiment of the present invention.

According to an embodiment of the present invention, a VPN network architecture involves a client and a network centric type architecture which may be applied to packet-based (e.g., layer-2 VPNs, layer-3 VPNs, etc.) or layer-1 VPNs, for example. Layer-2 VPN are a VPN service where the unit of service is a point-to-point or a multipoint-to-point layer-2 circuits, such as ATM, Frame relay or Ethernet. Layer-3 VPN is a VPN service where a customer outsources their layer-3 network to the provider. Customer equipment may peer at layer-3 (e.g., routing) with attached provider equipment, rather than remote customer equipments. It is the responsibility of the provider to distribute customer reachability to each site attached to the provider network. A layer-1 VPN is a port-based VPN where the customer may be attached to the provider equipment at layer-1. The customer can request layer-1 circuit/connectivity to the provider between sites. The VPN network architecture of the present invention takes into account the nature of client networks subscribing to network services in terms of client addressing scheme, client port and connectivity topologies, client mobility, client bandwidth evolution, etc. Flexibility for a service provider where addition of a new client service will involve configuration to devices attached to that service is provided. In addition, the VPN network architecture provides decoupling of access technologies from transport technologies used. Diversity in terms of access services supported over a single service provider network infrastructure as well as diversity and decoupling of transport media technology from actual control intelligence used within the provider network is provided by an embodiment of the present invention.

A carrier based VPN network architecture of the present invention may be characterized by intelligent functions for solving the level of operational complexity of existing networks; unified "transport independent" control plane for network consolidations; diversified transport technologies unified through a small set of control planes; and diversified VPN services on the same network infrastructure.

An optical VPN may be defined as a client private network with a set of sites connected through a service provider network. An OVPN service may involve a multi-site type connectivity based on inter-site (e.g., ports) topology, defined by a client (or customer) and enforced by a service provider. By using a switched connection model, the client (or clients) control a connectivity topology. As a multi-site service, the service provider is aware or is managing a VPN membership of the client.

A carrier-based optical VPNs architecture provides a variety of services to the client, such as security and privacy of customer related information (e.g., client control packets, etc.); transparency of the service provider; reliability of the VPN service; quality of service; and flexibility of the client.

Services available to the service provider may include scalability (e.g., in terms of number of OVPNs supported); open technology; manageability; flexibility (e.g., in terms of managing the OVPNs); cost-effective solutions; introduction of new features and services (e.g., evolvable infrastructure); and smooth integration within already deployed VPN services.

In the packet world, the "virtual" aspect of the VPNs may be defined as the ability to use provider shared network infrastructure. In the optical world, connectivity may relate to a circuit and/or a physical path where the concept of sharing is extended to include using common control plane (e.g., signalling, routing, etc.) and sharing internal physical nodes and/or links. Depending on the type of OVPN technology used, the service provider may appear as transparent (e.g., virtual) to a private client network.

FIG. 1 is a diagram illustrating a reference model for layer-3, layer-2 and optical VPNs in accordance with an embodiment of the present invention. A service provider network offering optical VPNs may include devices, such as optical cross connect, synchronous digital hierarchy (SDH) cross connect, provider optical network elements, routers, switches, etc. These devices may be partitioned into Provider devices (P) and Provider Edge devices (PE). P may be connected to nodes within the provider network. PEs may be connected to other nodes (e.g., either Ps or PEs) within the provider network as well as to devices outside of the provider network. Such other devices may be referred to as Client Edge Devices (CEs). An example of a CE may be a router, a synchronous optical network technologies (SONET)/SDH cross-connect, an Ethernet switch, I2 switch, etc.

As shown in FIG. 1, a service provider network 110 may include Provider devices 112, 114, 116 and 118. Provider Edge devices 120, 122 and 124 are connected to the Provider devices. In particular, PE 120 is connected to P 112 and P 116. PE 122 is connected to P 114 and PE 124 is connected to P 118. Client Edge devices 130 and 138 are connected to PE 120; CE 132 is connected to PE 122; CE 134 is connected to PE 124; and CE 136 is connected to PE 126.

Optical VPNs may be deployed for intranets and/or extranets. For example, if orthogonality between administrative ownership of a VPN and private organization exists, an OVPN service may be deployed for both intranet and extranet. For example, multiple organizations may subscribe to a VPN service and establish connectivity among them across the provider network. From the point of view of the provider, a single VPN is offered and implemented although the VPN is owned by multiple organizations, according to this example.

One specific deployment scenario may be referred to as a carrier's carrier model where clients may include carriers providing VPN services (e.g., layer-3, 2, 1 VPNs, etc.).

Figure 2:
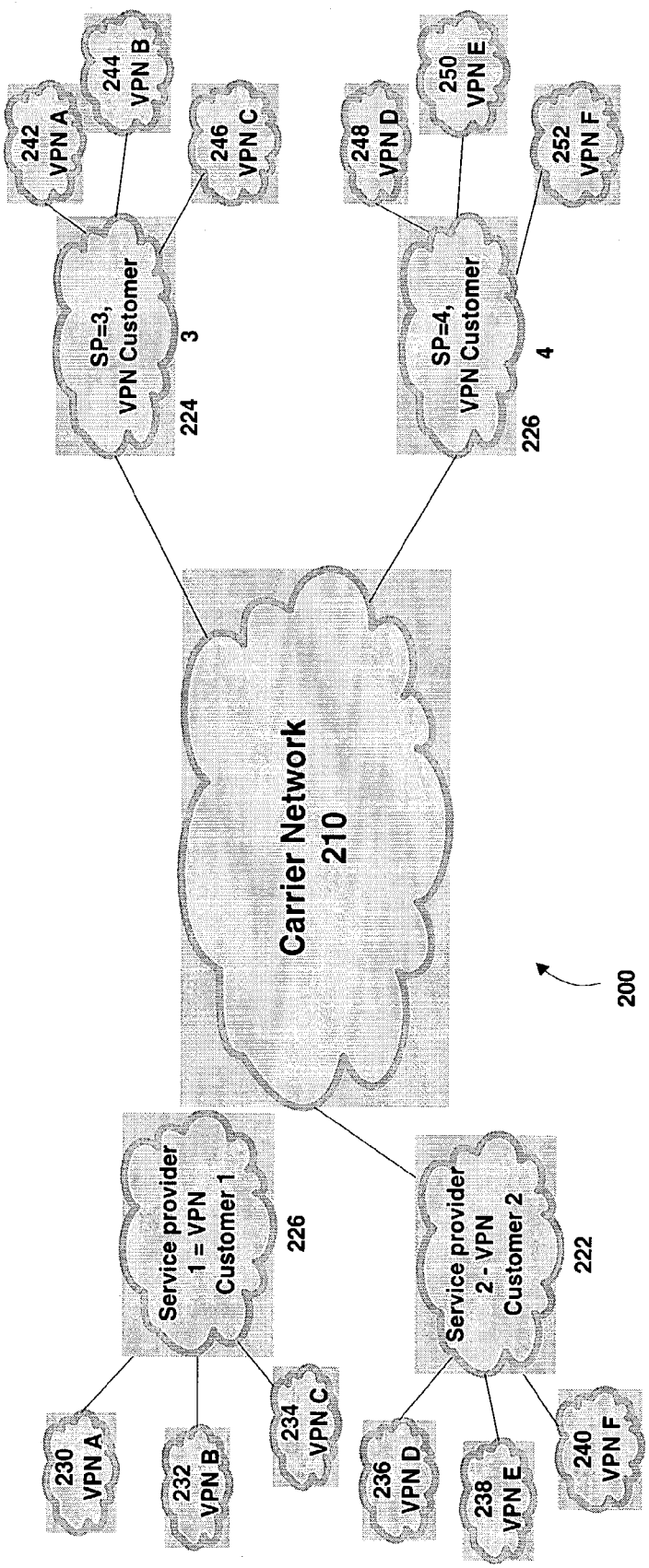
FIG. 2 is a diagram illustrating a carrier's carrier model 200 in accordance with an embodiment of the present invention.

FIG. 2 is a diagram illustrating a carrier's carrier model 200 in accordance with an embodiment of the present invention. Carrier network 210 may be connected to a service provider 220, service provider 222, service provider 224, service provider 226. Each service provider (e.g., 220, 222, 224, 226) which may also be a VPN customer itself and provide VPN services to other customers. Each service provider may support one or more VPNs. For example, SP 220 may be connected to VPN 230, VPN 232 and VPN 234. SP 222 may be connected to VPN 236, VPN 238 and VPN 240. SP 224 may be connected to VPN 242, VPN 244 and VPN 246. SP 226 may be connected to VPN 248, VPN 250 and VPN 252.

A VPN of an embodiment of the present invention may support an optical/TDM interface-user to network interface (OIF-UNI) based network infrastructure. Time Division Multiplexing may include SONET/SDH, for example. OIF-UNI may be used in the context of a carrier-carrier's based optical VPN scheme.

OIF-UNI may define a client as a service control interface between a transport network and client equipment. The client equipment may be connected to the transport network for optical transport services. Examples of client equipment may include IP routers, Asynchronous Transfer Mode (ATM) switches, Ethernet switches, SDH/SONET Cross-connects, etc.

A client may be an OVPN client where the client uses public addresses assigned by the service provider represented by Transport Network Assigned (TNA) addresses.

For example, when a UNI client uses private addresses (e.g., client addresses), an OVPN CE client is considered an UNI device. In another example, a TNA address may be exclusively assigned to the client attached to the provider network. TNA addresses are generally globally unique within the service provider network. A TNA address may be attached to a logical link leading to a client device and may be used for connectivity and neighbor discovery procedures. It is the responsibility of the service provider to have a priori knowledge to what client device and more precisely to what client logical link that TNA address corresponds to. In this case, a client access membership (e.g., client identity) may be established at configuration time of a port to a given client or more precisely at a link attachment and assignment time of the TNA address to the client. Thus, a client device identity is known from configuration or other indirect method before a neighbor discovery procedure is established (e.g., before service discovery procedure starts).

When OIF-UNI is used in a context of VPNs, a UNI-C capable device is itself a member of the private network. A VPN membership of the client may also be known at a client identification phase (e.g., particularly for clients using their own addressing scheme to request connectivity). As a result, an OIF-UNI client may be considered the VPN client subscribing to OVPN services and the VPN membership of UNI clients (e.g., OVPN client) may be known at port-provisioning time or at TNA address assignment time.

In accordance with an embodiment of the present invention, a UNI based model when used in a context of VPNs (e.g., UNI based VPN) may be a port-based VPN type (e.g., where VPN membership is known at port configuration or TNA assignment time).

Administrative ownership of OIF-UNI based VPN ports may be orthogonal to VPN membership of these ports (e.g., ports within a OVPN may belong to the same (intranet) or different (extranet) organizations). Therefore, multiple OVPN services may be instantiated on the same UNI based device owned by one or multiple organizations.

For UNI addressing, UNI may use TNA addresses for identifying connection endpoints. The TNA address may be assigned to a data bearing link where each TNA address may be a globally unique address assigned by a transport network to one or more data bearing links connecting a UNI-Network (UNI-N) and a UNI-client (UNI-C). In addition, a single TNA address may denote one or more data links. An individual data link within a group of links sharing the same TNA address may be identified by a logical port identifier at each end. Assignment of logical port identifiers may be a local decision of a node at each end. Thus, each data link connecting a client and a Transport Network Element (TNE) may be associated with two logical port identifiers, one on the client side and one on the TNE side. For UNI, a logical port identifier may be encoded as a 32-bit integer and may be considered unique within a node.

As a result, a TNA address may be a public address identifying a logical data bearing links. In order to enable the UNI to work properly, a minimum level of addressing (e.g., IPv4 based) within the client device may be required that includes a UNI-N and UNI-C identifier (e.g., node identifier) and IP control channel identifier (CCID). UNI-N and UNI-C node identifier may refer to an Internet Protocol (IP) address that identifies connection control plane termination endpoints (e.g., between UNI-C and UNI-N). IP CCID may be related to the endpoints of a control channel which may be identified for neighbor discovery, service discovery and IPCC maintenance. An IPCC may be numbered, in which case it is identified by an IPv4 address at each end, for example. It may be unnumbered identified by a combination of the node identifier and an interface index at each end of a CE-PE link. Therefore, a UNI based client may include Internet Protocol address(es) of 4 bytes length (IPv4) (e.g., for the purpose of signaling) and optionally unnumbered interfaces (for IPCC).

According to an embodiment of the present invention, a OIF-UNI client may offer connectivity based services to multiple users be it private networks or not. This model is called a carrier's carrier based VPN model.

For easy reference and to differentiate between the CE which subscribes to a VPN and a CE's clients which are the recipient of the connectivity, the CE's client is a CE-USER, and the VPN where the CE-USER is a member of, is a CE-VPN. According to an embodiment of the present invention, a determination of which connectivity is associated with a CE-USER may be the responsibility of the CE and not the service provider. In addition, an establishment of the connectivity may be the responsibility of the service provider managing the OVPN. Therefore, the service provider is not aware of the CE-USER and the CE-VPNs.

Figure 3:
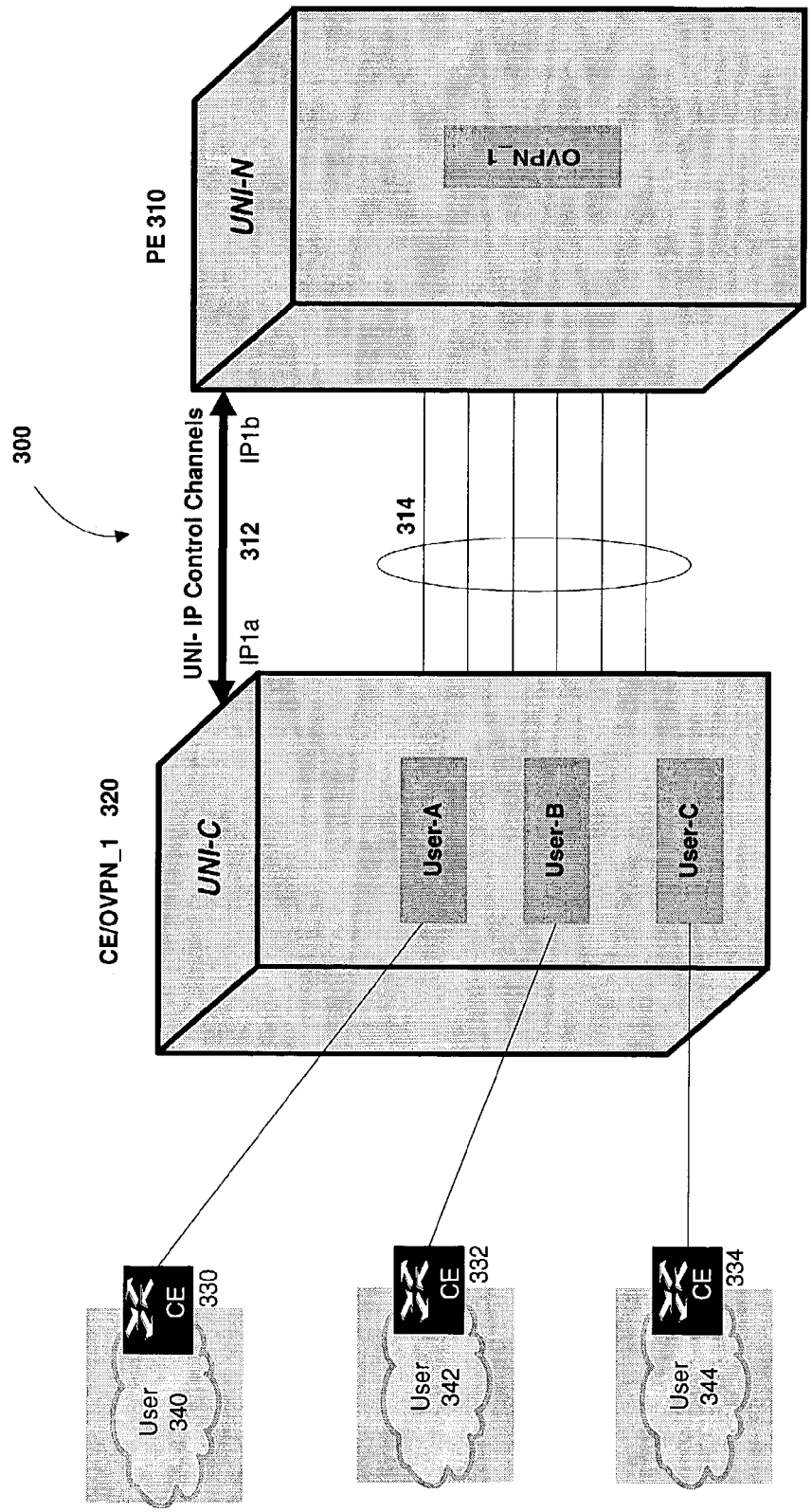
FIG. 3 is a diagram illustrating a carrier's carrier network in accordance with an embodiment of the present invention.

FIG. 3 is a diagram illustrating a carrier's carrier network in accordance with an embodiment of the present invention. A CE may be responsible for restricting connectivity within a CE-USER under its control while a service provider may be responsible for restricting connectivity within the CE's VPN. As a result, the service provider may manage only one OVPN while the CE manages many CE-VPNs.

As shown in FIG. 3, PE 310 is connected to a CE 320. PE 310 may function as a UNI-N and CE 320 may function as a UNI-C. Communication may be established by IP control channels 312 and CE private addresses 314. CE 320 is connected to a plurality of CE-USERs 330, 332 and 334, which respectively support user 340, user 342 and user 344.

A CE may use a private address to request connectivity to a destination CE. Therefore, it is the CE's responsibility to know whether there is one or more CE-USERs sharing the same CE-VPN on a remote CE.

According to an embodiment of the present invention, a CE may request connectivity only to CEs that have CE-VPN members in common. As this is a responsibility of a carrier's carrier, the CE knows a priori a set of CEs that have CE-USERs that are members of the same CE-VPN. For example, a CE may run a discovery mechanism for discovering CE-VPNs transparently to the service provider. Other mechanisms may include piggybacking CE-VPN discovery on top of a discovery running across a service provider, where the service provider is not aware of the CE-VPNs.

For example, techniques (e.g., 2547/VR membership distribution) may be used at a CE level and piggybacked on External Border Gateway Protocol (EBGP) at a CE-PE link and carried transparently across a service provider for distributing CE-VPN membership, for example. These techniques are generally outside the OVPN service being offered thereby significantly reducing complexity of a traditional call-model and its closed-user group (CUG) related facility. In addition, this approach offers flexibility in discovering CE-VPNs using auto-discovery type mechanisms. In a traditional CUG model, the CE needs to know about the CUG (e.g., local, remote) before requesting connectivity where the CE obtains CUG information through manual provisioning. Currently, the CUG based approach is not automated for discovering CE-VPNs.

Once the CE learns about the CE-USERs, the CE may request and associate a given connectivity between two CE-USERs without intervention from the service provider. The connectivity requests may carry addresses within a CE's addressing space and not within a CE-VPN addressing space. For a remote CE to know that a connectivity is for a given CE-VPN, the CE may piggyback a color (or other indicia) of the connectivity within a signaling protocol. This information is not screened by the service provider and is transparently carried over a provider network. In addition, a given CE may decide to assign at time "t" Synchronous Transport Signal—SONET (STS-1) connection to a CE-USER-1 through port 1 and after time 't+delta' CE_1 may tear down the connection and establish another STS-1 connection using the same CE port 1 but assigned to CE-USER-2. In addition, membership information associated with one or more client edge-users may be provided transparently to the service provider. Membership information may include an identifier, such as a virtual private network identifier and a global unique identifier.

An approach of the present invention provides improved flexibility and scalability. In a traditional CUG model, the number of VPNs a service provider will maintain is proportional to the number of CE-VPNs. However, according to an embodiment of the present invention, the number of VPNs may depend on a one-to-one membership of the CE with the VPN. For example, a CUG based model may involve each PE having three VPNs and each VPN having three sites and each CE subscribing to 1000 CE-VPNs (CUGs), each one with three sites. In a full mesh type topology, the service provider will have to manage 3000 different VPNs (along with specific CUG rules) and bill 9000 different optical connections. However, in the carrier's carrier model of an embodiment of the present invention, the service provider may manage three VPNs while each CE-VPN manages 1000 CE-USERs. In this model, the service provider bills for 9000 different connections; however, the number of CE-VPNs do not impact the number of the VPNs managed by the service provider. In this model, there is a clear service demarcation between CE's users (CE-USERs) and provider's VPN clients (CEs).

In a traditional CUG model, the fact that the CE uses its private addresses does not add any benefit since the network is aware of each CE-VPN.

The model of the present invention does not make any assumption on the nature of the CE since CE-VPN membership is distributed outside the OVPN service. The approach of the present invention may accommodate multiple VPN architectures on a CE side. However, a traditional CUG approach requires the CE and the PE to cooperate on the CUG subscriptions and connectivity. In addition, for an interface supporting multiple CUGs (e.g., selectable CUGs), the CE may be required to signal the CUG number which needs to be screened by the service provider where the provider equipment matches the signaled CUG value to the configured CUG value.

According to an embodiment of the present invention, VPN's carrier's carrier model may implement public addresses. In this case, clients do not have private addresses or do not want to use private addresses on connectivity requests while restricting connectivity to a set of CE-VPNs. The added-value of the OVPN service involves the use of private addresses, rather than public addresses. Three exemplary options may include using a CUG facility; clients deciding what call they accept or reject according to CE-VPNs they manage; and clients assigning ports to different CE-VPNs where a set of ports owned by a given CE-VPN is treated as belonging to different optical VPN services.

In some instances, clients may not have private addresses, clients may not want to use private addresses or clients may want to use TNA addresses. Clients may want to restrict connectivity for a set of CE-USERs to a part of CE-VPNs under their control. Public addresses may be assigned and reserved for CEs for the purpose of connectivity between CE1, CE2, and CE3. Clients may submit a port topology where potential connectivity may take place among CE-USERs.

Figure 4:
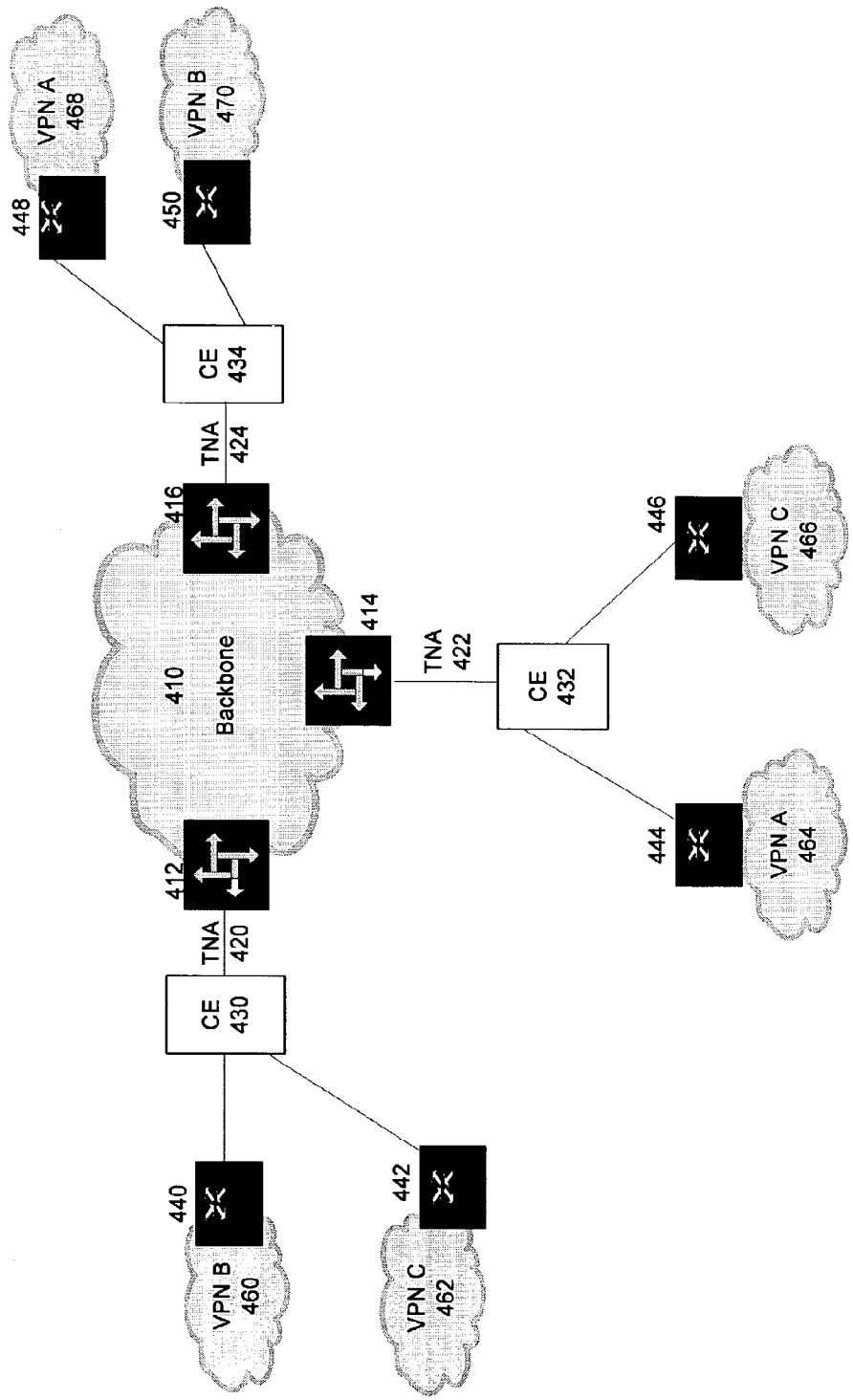
FIG. 4 is a diagram of CE-VPNs in accordance with an embodiment of the present invention.

FIG. 4 is a diagram of CE-VPNs in accordance with an embodiment of the present invention. As shown in FIG. 4, backbone 410 may include a service provider network. Backbone 410 may support PE 412, 414, and 416. PE 412 may connect to CE 430 via a TNA 420. PE 414 may connect to CE 432 via TNA 422. PE 416 may connect to CE 434 via TNA 424. CE 430 may represent a single OVPN which further connects to CE-User 440 and CE-User 442. CE-User 440 may be connected to VPN B 460 and CE-User 442 may be connected to VPN C 462. CE 432 may represent a single OVPN which further connects to CE-User 444 and CE-User

446. CE-User 444 may be connected to VPN A 464 and CE-User 446 may be connected to VPN C 466. CE 434 may represent a single OVPN which further connects to CE-User 448 and CE-User 450. CE-User 448 may be connected to VPN A 468 and CE-User 450 may be connected to VPN B 470.

Since clients are aware of CE-VPN memberships, clients may only need to know what CE-VPN members are behind each CE addressable using TNAs. In this case, two approaches may be implemented. For example, the clients may run a discovery mechanism outside an OVPN service to discover CE-VPN users. In another example, a client may subscribe to a discovery mechanism for the CE-VPN users implemented by the service provider. The service provider has the responsibility to inform the client of the list of CE-VPN users it controls.

In another example, UNI clients may not be members of a private network. In this case, the UNI clients are not members of a given private network, but still provide VPN services to other CE-VPNs. In order for the client to restrict connectivity, the client may need to know a list of CEs that have CE-VPN users member of the same VPN with a list of CE TNAs and a connectivity topology implemented within each CE-VPN. Once the clients obtain the list of CE-VPN members with their associated public addresses, connectivity may be restricted to the remote CE-VPN users. This approach suggests that the service provider will not screen a source and a destination CE-VPN membership signaled through a call request. However, it is the joint responsibility of the service provider and the client to agree on a level of security of piggybacked data carried within the connection request.

At this point it should be noted that implementing an optical virtual private network in accordance with the present invention as described above typically involves the processing of input data and the generation of output data to some extent. This input data processing and output data generation may be implemented in hardware or software. For example, specific electronic components may be employed in a node or similar or related circuitry for implementing the functions associated with implementing an optical virtual private network in accordance with the present invention as described above. Alternatively, one or more processors operating in accordance with stored instructions may implement the functions associated implementing an optical virtual private network in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A client edge (CE) node for interfacing with a carrier network to implement a client edge virtual private network (CE-VPN), the CE node comprising:
   at least one communication interface configured to connect the CE node to a carrier network;
   at least one processor coupled to the at least one communication interface; and
   at least one storage medium storing instructions executable by the at least one processor, the instructions comprising:
      instructions executable by the at least one processor to implement a CE-VPN to provide a virtual private network (VPN) service through the CE-VPN;
      instructions executable by the at least one processor to associate a set of client edge users (CE-Users) with the CE-VPN, the set of CE-Users comprising at least one CE-User;
      instructions executable by the at least one processor to determine connectivity for each CE-User of the set of CE-Users;
      instructions executable to establish the determined connectivity for each CE-User of the set of CE-Users; and
      instructions executable by the at least one processor to provide the VPN service to each CE-User of the set of CE-Users.

2. The CE node of claim 1, wherein the instructions comprise instructions executable by the at least one processor to discover other CE-Users in the set of CE-Users.

3. The CE node of claim 2, wherein the instructions comprise instructions executable by the at least one processor to process a request from a first CE-User for a connection to a second CE-User.

4. The CE node of claim 3, wherein the instructions executable by the at least one processor to process the request from the first CE-User for the connection to the second CE-User comprise instructions executable by the at least one processor to establish the connection without intervention from a third party.

5. The CE node of claim 1, wherein the instructions comprise instructions executable by the at least one processor to provide to a third party membership information associated with at least one of the CE-Users.

6. The CE node of claim 5, wherein the membership information comprises a VPN identifier.

7. The CE node of claim 5, wherein the membership information comprises a global unique identifier.

8. The CE node of claim 1, wherein the instructions comprise instructions executable to request connectivity to another CE node using a private address.

9. The CE node of claim 1, wherein the instructions comprise instructions executable to request connectivity to another CE node using an address assigned by a transport network.

10. The CE node of claim 1, wherein the CE node comprises a router.

11. The CE node of claim 1, wherein the CE node comprises a cross-connect device.

12. The CE node of claim 1, wherein the CE node comprises a switch.

13. The CE node of claim 1, wherein the VPN is an optical VPN.

14. A non-transitory storage medium storing instructions for execution by at least one processor of a client edge (CE) node to interface the CE node with a carrier network to implement a client edge virtual private network (CE-VPN) to provide a virtual private network (VPN) service through the CE-VPN, the instructions comprising:
- instructions executable by the at least one processor to associate a set of client edge users (CE-Users) with the CE-VPN, the set of CE-Users comprising at least one CE-User;
- instructions executable by the at least one processor to determine connectivity for each CE-User of the set of CE-Users;
- instructions executable to establish the determined connectivity for each CE-User of the set of CE-Users; and
- instructions executable by the at least one processor to provide the VPN service to each CE-User of the set of CE-Users.

15. The medium of claim 14, wherein the instructions comprise instructions executable by the at least one processor to discover other CE-Users in the set of CE-Users.

16. The medium of claim 15, wherein the instructions comprise instructions executable by the at least one processor to process a request from a first CE-User for a connection to a second CE-User.

17. The medium of claim 16, wherein the instructions executable by the at least one processor to process the request from the first CE-User for the connection to the second CE-User comprise instructions executable by the at least one processor to establish the connection without intervention from a third party.

18. The medium of claim 14, wherein the instructions comprise instructions executable by the at least one processor to provide to a third party membership information associated with at least one of the CE-Users.

19. The medium of claim 18, wherein the membership information comprises a VPN identifier.

20. The medium of claim 18, wherein the membership information comprises a global unique identifier.

21. The medium of claim 14, wherein the instructions comprise instructions executable to request connectivity to another CE node using a private address.

22. The medium of claim 14, wherein the instructions comprise instructions executable to request connectivity to another CE node using an address assigned by a transport network.

* * * * *